United States Patent
Micalizzi, Jr.

(10) Patent No.: US 7,765,317 B1
(45) Date of Patent: Jul. 27, 2010

(54) SYSTEM AND METHODS FOR LOCATING FPDU HEADERS WHEN MARKERS ARE DISABLED

(75) Inventor: Charles Micalizzi, Jr., Capistrano Beach, CA (US)

(73) Assignee: QLOGIC, Corporation, Aliso Viejo, CA (US)

(*) Notice: Subject to any disclaimer, the term of this patent is extended or adjusted under 35 U.S.C. 154(b) by 281 days.

(21) Appl. No.: 12/165,464

(22) Filed: Jun. 30, 2008

(51) Int. Cl.
*G06F 15/16* (2006.01)
*G06F 15/173* (2006.01)

(52) U.S. Cl. .................. 709/232; 709/212; 709/236; 709/250

(58) Field of Classification Search ............ 709/232, 709/236, 212, 250
See application file for complete search history.

(56) References Cited

U.S. PATENT DOCUMENTS

| | | | |
|---|---|---|---|
| 6,377,782 B1* | 4/2002 | Bishop et al. ............ | 455/3.01 |
| 7,441,006 B2* | 10/2008 | Biran et al. ............ | 709/212 |
| 2004/0153578 A1* | 8/2004 | Elzur ............ | 709/250 |
| 2005/0071131 A1* | 3/2005 | Anderson et al. ........ | 702/189 |
| 2007/0165672 A1* | 7/2007 | Keels et al. ............ | 370/474 |
| 2007/0288828 A1* | 12/2007 | Biran et al. ............ | 714/758 |
| 2007/0291779 A1* | 12/2007 | Wunderlich ............ | 370/411 |
| 2008/0043750 A1* | 2/2008 | Keels et al. ............ | 370/395.52 |

* cited by examiner

*Primary Examiner*—Kenny S Lin
(74) *Attorney, Agent, or Firm*—Klein, O'Neill & Singh, LLP

(57) ABSTRACT

The present system and methods perform a series of cyclic redundancy checks (CRCs) on data within a transmission control protocol (TCP) segment. If any of the CRCs are successful, it is determined that the FPDU has been located, and the FPDU is processed. When one of the CRCs fails, additional steps are taken to determine if a potential FPDU is in fact an FPDU. In one such step a plurality of payload testing key fields in a direct data placement (DDP) header of an offset in the TCP segment are walked to determine a probability of the offset being the start of an FPDU.

17 Claims, 5 Drawing Sheets

Tagged Buffer DDP Header

Untagged Buffer DDP Header

MPA, DDP, and RDMAP Header Alignment

SYSTEM AND METHODS FOR LOCATING FPDU HEADERS WHEN MARKERS ARE DISABLED

BACKGROUND OF THE INVENTION

1. Field of the Invention

The present invention relates to direct data placement protocol.

2. Description of Related Art

In transmission control protocol/Internet protocol (TCP/IP), data travels between nodes on a computer network in pieces called segments or packets. The sending node divides the data into segments, sends the packets across the network to the receiving node, and the receiving node reassembles the received packets and stores the data in memory (or a memory buffer). The data carried by TCP segments (the payload) is divided into units called protocol data units (PDU's), or framed protocol data units (FPDU's). Each FPDU includes a header. The header contains control and placement fields that define the final placement location for the TCP payload carried in a TCP segment.

Typical communications over TCP/IP require copy operations, which add latency and consume significant CPU and memory resources. Direct data placement protocol (DDP) enables an upper layer protocol (ULP) to send data to a data sink without requiring the data sink to place the data in an intermediate buffer. When the data arrives at the data sink, the network interface places the data directly into the ULP's buffer. This procedure enables the data sink to consume substantially less memory bandwidth than a buffered model, because the data sink is not required to move the data from the intermediate buffer to the final destination. Additionally, this procedure enables the network protocol to consume substantially fewer CPU cycles compared to using the CPU to move the data. This procedure also removes any bandwidth limitations caused by slow data copying speeds of the CPU. The DDP specification ("Direct Data Placement over Reliable Transports," available from The Internet Engineering Task Force (IETF) at http://tools.ietf.org/html/rfc5041) provides further information on DDP. The DDP specification is incorporated herein by reference.

DDP supports two basic data transfer models—a tagged buffer data transfer model and an untagged buffer data transfer model. The tagged buffer data transfer model requires the data sink to send the data source an identifier for the ULP buffer, referred to as a steering tag (STag). A ULP-defined method transfers the Slag to the data source. Once the data source ULP has an STag for a destination ULP buffer, it can request that DDP send the ULP data to the destination ULP buffer by specifying the STag to DDP. FIG. 1 illustrates a tagged buffer DDP header 20, including an STag 22.

The untagged buffer data transfer model enables data transfer without requiring the data sink to advertise a ULP buffer to the data source. The data sink can queue up a series of receive ULP buffers. An untagged DDP message from the data source consumes an untagged buffer at the data sink. FIG. 2 illustrates an untagged buffer DDP header 24.

At the data source, the DDP layer segments the data contained in a ULP message into a series of DDP segments/TCP segments (used interchangeably herein), where each DDP segment contains a DDP header and ULP payload. DDP message segmentation at the data source is accomplished by identifying a DDP message (which corresponds one-to-one with a ULP message) uniquely and then, for each associated DDP segment of a DDP message, by specifying an octet offset for the portion of the ULP message contained in the DDP segment.

The remote direct memory access protocol (RDMAP) is layered on top of DDP and uses the two buffer models available from DDP. FIG. 3 depicts the relationship between upper layer protocols (ULPs) 26, RDMAP 28, DDP protocol 30, the framing layer 32, and the transport 34. If RDMAP is layered over DDP/MPA/TCP, then the respective headers 36 and ULP Payload 38 are arranged as shown in FIG. 4. The RDMAP specification ("A Remote Direct Memory Access Protocol Specification," available from IETF at http://tools.ietf.org/html/rfc5040) provides further information on RDMAP. The RDMAP specification is incorporated herein by reference.

Many current protocols used in Internet applications and elsewhere assume that data is delivered and placed in order. RDMAP, by contrast, does not provide ordering among messages on different RDMAP streams. TCP segments may thus arrive out of order at the data sink. Further. FPDU's do not always align with the payloads of their respective TCP segments, meaning that the first word of the payload may not be the FPDU header. In these situations, the receiving node must locate the FPDU header within the payload in order to properly place the data in memory.

Marker PDU aligned framing (MPA) is one method for locating FPDU headers in segments delivered out of order. MPA works as an adaptation layer between TCP and DDP. MPA markers identify the start of FPDU's when packets are received out of order. A marker is a back pointer to the previous FPDU header. The markers are located at fixed intervals in the data stream so that the receiving node can easily find them. The MPA specification ("Marker PDU Aligned Framing for TCP Specification," available from IETF at http://tools.ietforg/html/rfc5044) provides further information on MPA. The MPA specification is incorporated herein by reference.

Unfortunately, the process of inserting markers into the data stream prior to data transmission is cumbersome. Further, the process of extracting the markers from the data stream prior to data storage is also difficult. Using markers thus increases hardware complexity, since extra computing power is needed to deal with the cumbersome processes of adding and extracting markers.

SUMMARY OF THE INVENTION

The preferred embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description of the Preferred Embodiments," one will understand how the features of the present embodiments provide advantages, which include the ability to locate FPDU headers without the need for cumbersome markers.

One aspect of the present system and methods includes the realization that it would be advantageous to enable out of order receipt of TCP segments without relying on markers. Markers are cumbersome to insert into and remove from the data stream.

One embodiment of the present methods comprises locating a marker protocol data unit aligned (MPA) framed protocol data unit (FPDU) in an out of order transmission control protocol (TCP) segment when markers are disabled. The method comprises performing a first cyclic redundancy check (CRC) on all data within the TCP segment. When the first CRC fails, what is assumed to be an FPDU_length value read and a second CRC is performed on a portion of the data specified by the FPDU_length value. When the second CRC fails, a plurality of payload testing key fields in a direct data placement (DDP) header of an offset in the TCP segment are walked to determine a probability of the offset being the start of an FPDU. Upon identifying a potential FPDU, a third CRC is performed on the potential FPDU. When the third CRC is successful, it is determined that the potential FPDU is an actual FPDU, and the actual FPDU is processed.

Another embodiment of the present methods comprises locating a marker protocol data unit aligned (MPA) framed protocol data unit (FPDU) in an out of order transmission control protocol (TCP) segment when markers are disabled. The method comprises performing a first cyclic redundancy check (CRC) on all data within the TCP segment. When the first CRC fails, what is assumed to be an FPDU_length value is read and a second CRC is performed on a portion of the data specified by the FPDU_length value. When the second CRC: fails, a plurality of payload testing key fields in a direct data placement (DDP) header of an offset in the TCP segment are walked to determine a probability of the offset being the start of an FPDU. Upon determining that the potential FPDU is not an actual FPDU, the process moves to a subsequent offset in the TCP segment and decrements a TCP payload size value by one. The method further comprises comparing the TCP payload size value to a minimum FPDU size. When the TCP payload size value is not less than the minimum FPDU size, the step of walking the plurality of payload testing key fields is repeated.

Another embodiment of the present methods comprises locating a marker protocol data unit aligned (MPA) framed protocol data unit (FPDU) in an out of order transmission control protocol (TCP) segment when markers are disabled. The method comprises performing a first cyclic redundancy check (CRC) on all data within the TCP segment. When the first CRC: fails, what is assumed to be an FPDU_length value is read and a second CRC is performed on a portion of the data specified by the FPDU_length value. When the second CRC is successful, it is determined that the FPDU is located at a beginning of a payload of the TCP segment, and the FPDU is processed.

One embodiment of the present system comprises a host system including a processor, memory and a remote direct memory access (RDMA) enabled network interface controller (RNIC). The RNIC includes a processor and a memory. The host system is configured to perform a first cyclic redundancy check (CRC) on all data within the TCP segment. When the first CRC fails, the host system reads what is assumed to be an FPDU_length value and performs a second CRC on a portion of the data specified by the FPDU_length value. When the second CRC fails, the host system walks a plurality of payload testing key fields in a direct data placement (DDP) header of an offset in the TCP segment to determine a probability of the offset being the start of an FPDU. Upon identifying a potential FPDU, the host system performs a third CRC on the potential FPDU. When the third CRC is successful, the host system determines that the potential FPDU is an actual FPDU, and processes the actual FPDU.

BRIEF DESCRIPTION OF THE DRAWINGS

The preferred embodiments of the present system and methods now will be discussed in detail with an emphasis on highlighting the advantageous features. These embodiments depict the novel and non-obvious system and methods shown in the accompanying, drawings, which are for illustrative purposes only. These drawings include the following figures, in which like numerals indicate like parts.

DETAILED DESCRIPTION OF THE PREFERRED EMBODIMENTS

Figure 1:
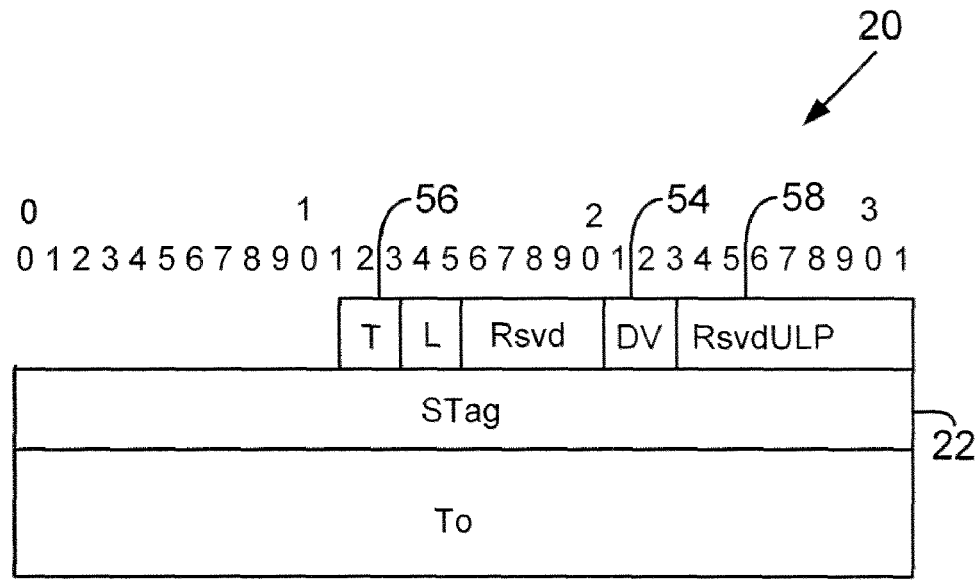
FIG. 1 is a schematic representation of a tagged buffer DDP header.

In the detailed description that follows, the present embodiments are described with reference to the drawings. In the drawings, elements of the present embodiments are labeled with reference numbers. These reference numbers are reproduced below in connection with the discussion of the corresponding drawing features.

Definitions

Cyclic redundancy check (CRC)—a checksum to detect alteration of data during transmission or storage.

Direct data placement protocol (DDP)—A mechanism whereby ULP data contained within DDP segments are placed directly into its final destination in memory without processing of the ULP. DDP may occur even when the DDP Segments arrive out of order.

Data sink—The peer receiving a data payload.

Data source—The peer sending a data payload.

DDP header—The header present in all DDP segments. The DDP header contains control and placement fields that define the final placement location for the ULP payload carried in a DDP segment.

DDP segment—The smallest unit of data transfer for the DDP protocol. It includes a DDP header and ULP payload.

DDP tagged flag (1 bit field)—Specifies the tagged or untagged buffer model. If set to one, the ULP payload carried in that DDP Segment must be placed into a tagged buffer.

DDP version number (2 bit field)—The version of the DDP Protocol in use.

iWARP—A suite of wire protocols comprised of RDMAP. DDP, and marker PDU aligned framing for TCP (MPA). The iWARP protocol suite may be layered above TCP, SCTP, or other transport protocols.

Lower Layer Protocol (LLP)—The protocol layer beneath the protocol layer currently being referenced. For DDP, the LLP is SCTP DDP adaptation, MPA, or other transport protocols. For RDMA, the LLP is DDP.

Marker—A four-octet field placed in the MPA data stream at fixed octet intervals (every 512 octets).

Message offset (MO)—For the DDP untagged buffer model, specifies the offset, in octets, from the start of a DDP message.

Message sequence number (MSN)—For the DDP untagged buffer model, specifies a sequence number that is increasing with each DDP message.

Node—A computing device attached to one or more links of a network.

Pad count—A 1-3 octet group of zeros used to fill an FPDU to an exact modulo 4 size.

Queue Number (QN)—For the DDP untagged buffer model, identifies a destination data sink queue for a DDP segment.

RDMA enabled network interface controller (RNIC)—A network I/O adapter or embedded controller with iWARP functionality.

Remote direct memory access (RDMA)—A method of accessing memory on a remote system in which the local system specifies the remote location of the data to transfer. Employing an RNIC in the remote system allows the access to take place without interrupting the processing of the CPU(s) on the system.

Remote direct memory access protocol (RDMAP)—A wire protocol that supports RDMA operations to transfer ULP data between a local peer and a remote peer.

RDMA opcode (4 bit field)—RDMA opcodes are defined as follows:

| RDMA Opcode | Message Type |
|---|---|
| 0000b | RDMA Write |
| 0001b | RDMA Read Request |
| 0010b | RDMA Read Response |
| 0011b | Send |
| 0100b | Send with Invalidate |
| 0101b | Send with Solicited Event |
| 0110b | Send with Solicited Event and Invalidate |
| 0111b | Terminate |
| 1000b to 1111b | Reserved |

Steering tag (Stag)—An identifier of a tagged buffer on a node, valid as defined within a protocol specification.

Tagged offset (TO)—The offset within a tagged buffer on a node.

ULP payload—The ULP data contained within a single protocol segment or packet (e.g., a DDP Segment).

Upper layer protocol (ULP)—The protocol layer above the protocol layer currently referenced. The ULP for RDMA/DDP is typically an operating system (OS), application, adaptation layer, or proprietary device.

Figure 5:
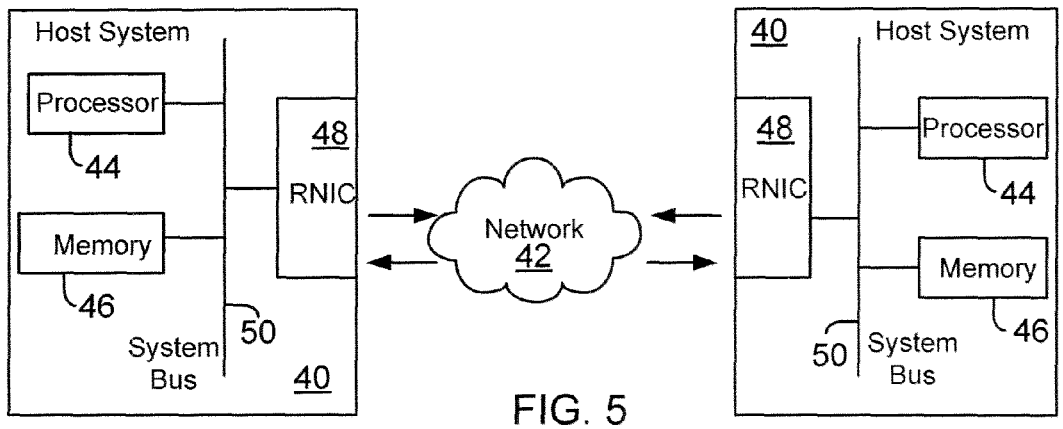
FIG. 5 is a functional block diagram of two host systems connected to a computer network.

FIG. 5 is a functional block diagram of two host systems 40, or nodes, connected to a computer network 42. Each host system 40 is configured for use in the present system and methods for locating FPDU headers when markers are disabled. Each host 40 includes a processor 44 and memory 46. Each host 40 further includes an RNIC 48 that enables the host 40 to communicate with the network 42. A system bus 50 interconnects the components of the host 40 and enables them to communicate with one another.

Figure 6:
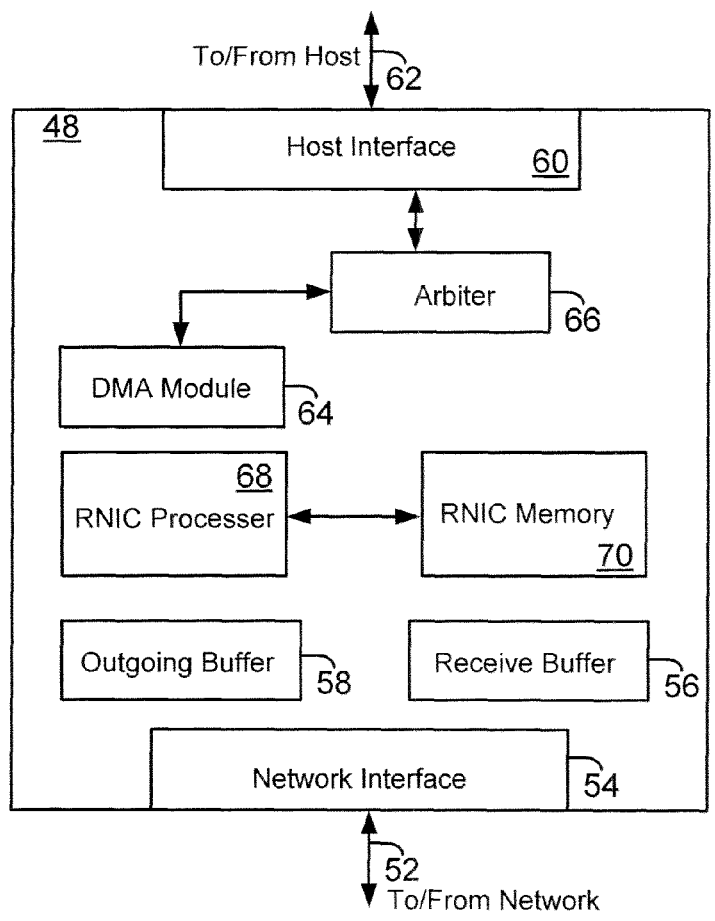
FIG. 6 is a functional block diagram of an RNIC configured for use in the present system and methods.

FIG. 6 illustrates an RNIC 48 configured for use in the present system and methods. The RNIC 48 receives and sends network packets 52 via a network interface 54 and a network connection (not shown). The structure of the network interface 54 depends on the type of protocol and network environment with which the RNIC 48 operates. A receive buffer 56 stores packets as soon as they are received. An outgoing buffer 58 stages packets before they are sent to the network. A host interface 60 enables the RNIC 48 to communicate with the host system 40 via a bus 62. The bus 62 may be a PCI, PCI-X, PCI-Express or any other type of bus.

A direct memory access (DMA) module 64 sends DMA requests to an arbiter 66 to access the bus 62 for sending data to the host system 40. The arbiter 66 arbitrates between competing requests and grants bus access to a request that wins the arbitration scheme.

An RNIC processor 68 executes instructions out of an RNIC memory 70. In one embodiment, more than one processor 68 may send and receive network information. For example, one processor (or state machine) may handle receive operations (packets received by the RNIC 48) and another processor (or state machine) may handle outgoing operations (packets transmitted by the RNIC 48).

Figure 7A:
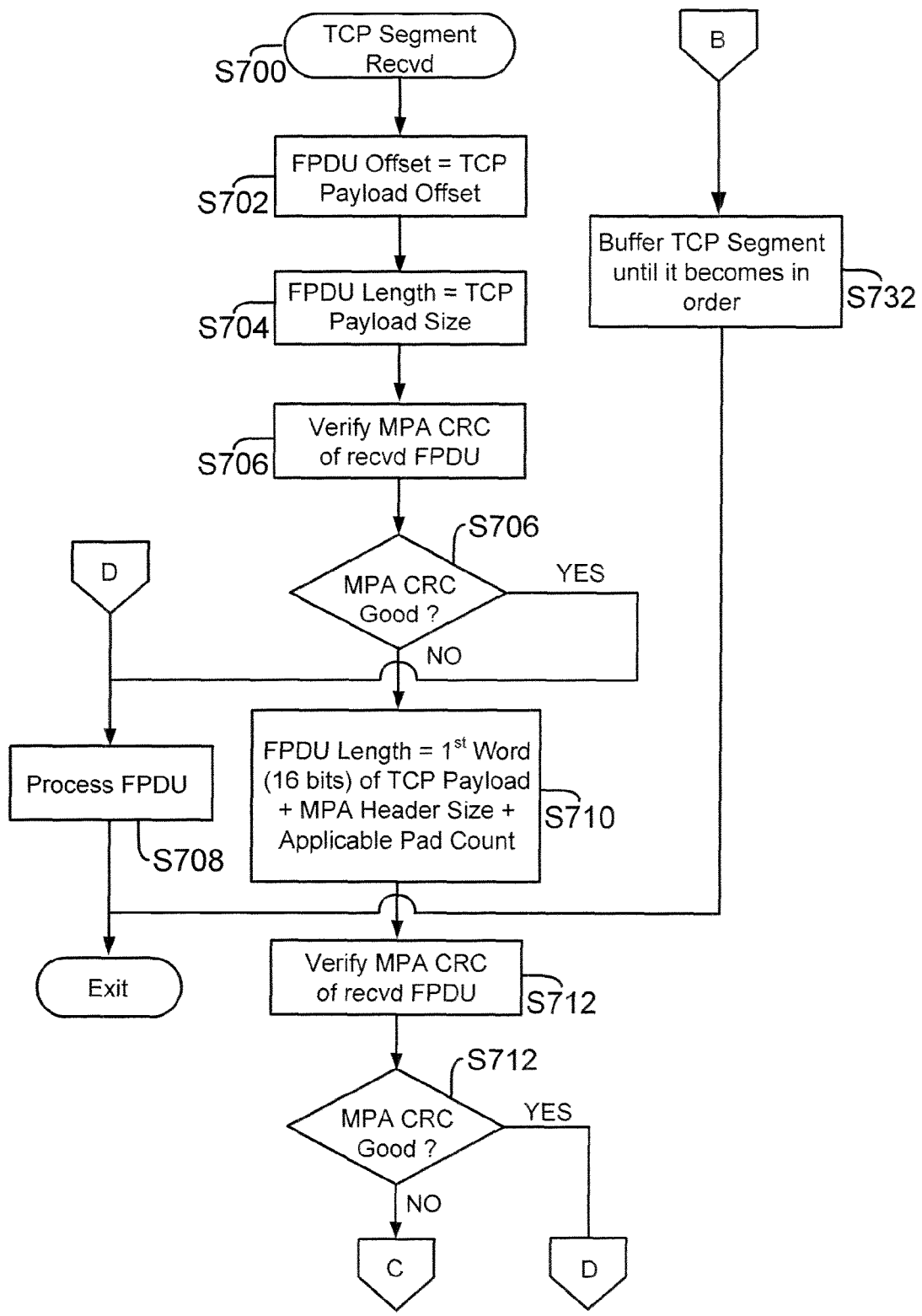
FIG. 7A is a process flowchart illustrating one embodiment of the present methods for locating FPDU headers when markers are disabled.
Figure 7B:
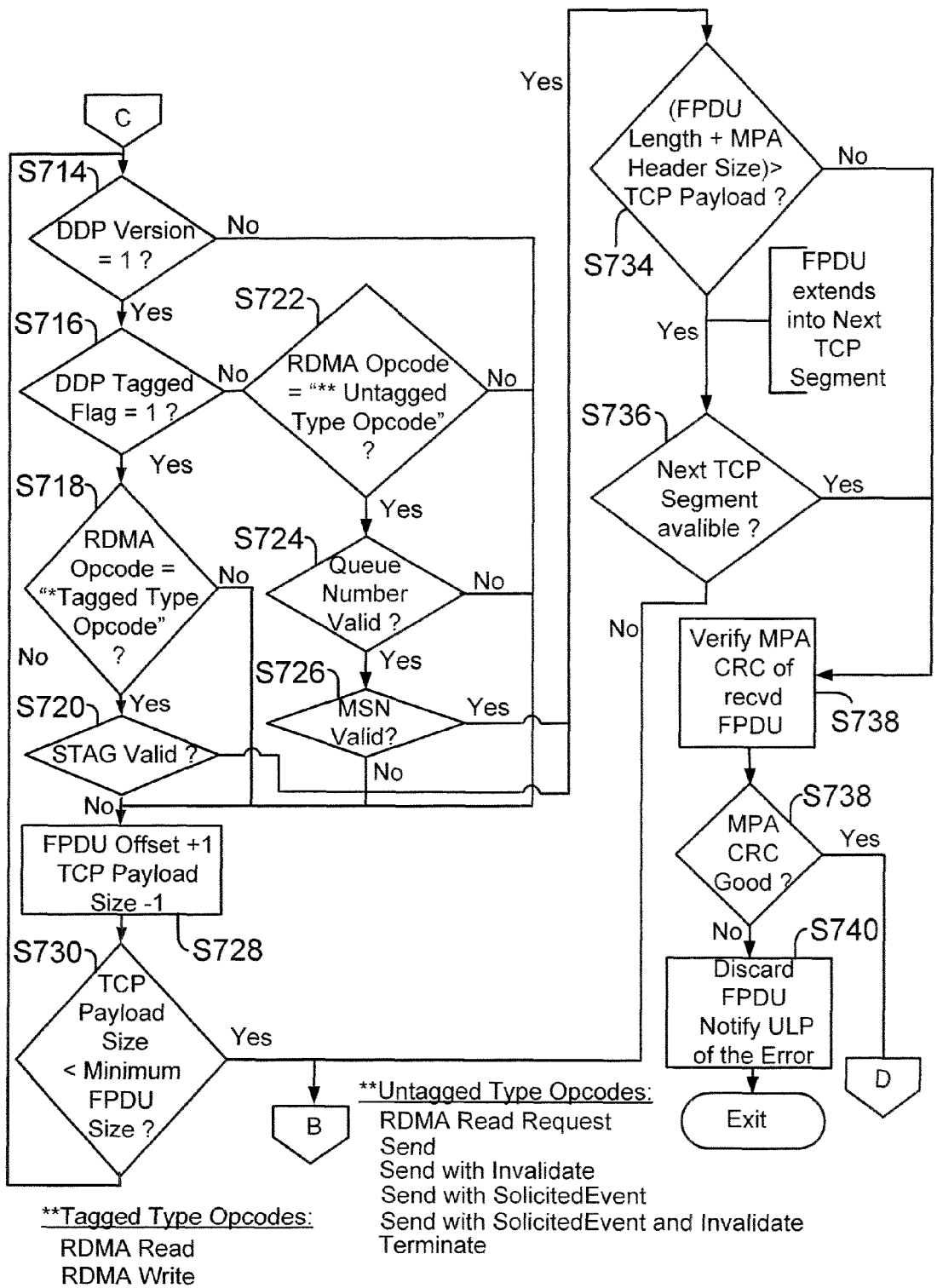
FIG. 7B is a process flowchart illustrating one embodiment of the present methods for locating FPDU headers when markers are disabled.

Embodiments of the present system and methods enable a receiving node to locate FPDU headers within TCP segments without the aid of cumbersome markers. FIGS. 7A and 7B illustrate process steps in one embodiment of the present methods for locating FPDU headers when markers are disabled. The process begins when a TCP segment is received at step S700. The present embodiments assume that the received TCP segment and/or the TCP connection meet the following criteria: no checksum error, the TCP connection is an RDMAP stream, the TCP segment is received out of order, MPA markers are not enabled, and MPA CRC checking is enabled. If any of the above criteria is not met, then the TCP segment is handled according to standard procedures that are not relevant to the present embodiments.

At step S702, the present method assumes that the FPDU offset is equal to the TCP payload offset. In other words, the present method assumes that the FPDU header is located at the beginning of the TCP payload. At step S704, the present method assumes that the FPDU length is equal to the TCP payload size. This assumption will be true if the TCP payload contains only one FPDU header. In RDMAP, it is possible for a TCP segment to contain two FPDU headers. At step S706, a CRC is performed on the TCP segment. If the CRC is good, the assumptions made in steps S702 and S704 are validated, and the RNIC processes the FPDU at step S708.

If the CRC performed at step S706 is not good, then the assumptions made in steps S702 and S704 have not been validated, but further tests are required to determine which of the assumptions is incorrect, or whether both assumptions are incorrect. Thus, at step S710 it is assumed that the FPDU header is located at the beginning of the TCP payload, and the FPDU length is assumed to be equal to the first word of the TCP payload plus the MPA header size plus an applicable pad count. At step S712, a CRC is again performed on the TCP segment. If the CRC is good, the assumptions made in step S710 are validated, and the RNIC processes the FPDU at step S708.

Figure 2:
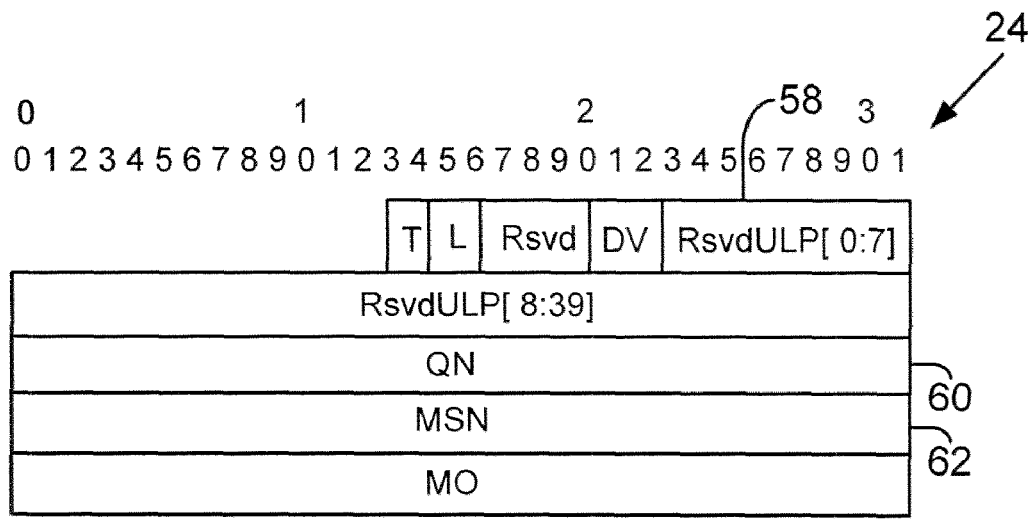
FIG. 2 is a schematic representation of an untagged buffer DDP header.
Figure 3:
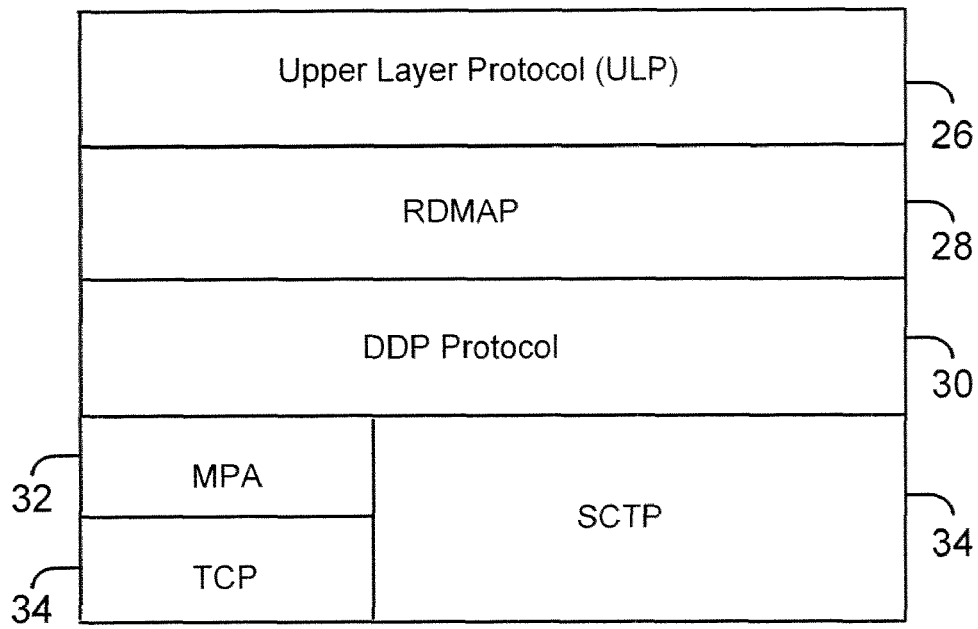
FIG. 3 is a schematic representation of the relationship between upper layer protocol (ULP), RDMAP, DDP protocol, the framing layer, and the transport.
Figure 4:
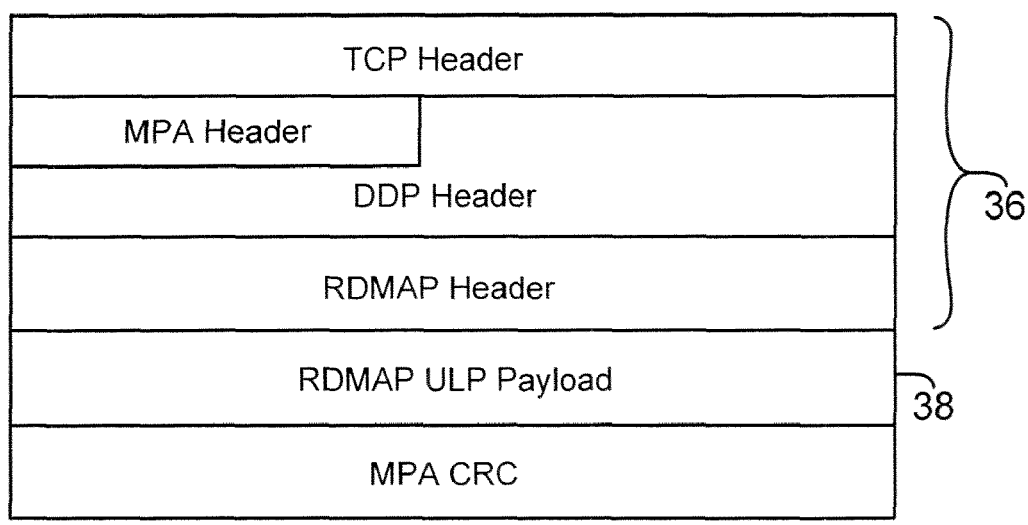
FIG. 4 is a schematic representation of a TCP segment.

If the CRC performed at step S712 is not good, then the assumptions made in step S710 have not been validated. At this point the RNIC begins walking through the payload testing key fields to determine the probability of the current offset being the FPDU header. The payload testing key fields walked depend upon whether the TCP segment includes a tagged header or an untagged header. With reference to FIG. 7B, steps S714, S716, S718 and S720 pertain to TCP segments including tagged headers, and steps S722, S724 and S726 pertain to TCP segments including untagged headers. FIGS. 1 and 2 illustrate a tagged header and an untagged header. The tagged header includes a DDP version number 54, a DDP tagged flag 56, an RDMA opcode 58 and a steering tag (STag) 22. The untagged header includes an RDMA opcode 58, a queue number 60 and a message sequence number (MSN) 62. Examples of tagged RDMA opcodes include RDMA read requests and RDMA write requests. Examples of untagged RDMA opcodes include RDMA read requests, send requests, send with invalidate requests, send with solicited event requests, send with solicited event and invalidate requests, and terminate requests.

For the tagged header, at step S714 the RNIC checks the DDP version number. If the DDP version number is equal to one, the process moves to step S716. However, if the DDP version number is not equal to one, the process moves to step S728 where the FPDU offset is increased by one and the TCP payload size is decreased by one. Then at step S730 the RNIC checks whether the TCP payload size is less than the minimum FPDU size. If the TCP payload size is not less than the minimum FPDU size, then the process returns to step S714. But if the TCP payload size is less than the minimum FPDU size then at step S732 (FIG. 7A) the TCP segment is buffered until it becomes in order.

If the DDP version number was found to be equal to one at step S714, then the process moves to step S716. At step S716, the RNIC checks the DDP tagged flag. If the DDP tagged flag is not equal to one, then the process moves to step S722, because the TCP segment includes an untagged header. If, however, the DDP tagged flag is equal to one, then the process moves to step S718. At step S718 the RNIC checks that the RDMA opcode is a tagged type opcode. Tagged type opcodes include read and write commands, as indicated in the lower left of FIG. 7B.

If the RDMA opcode is not a tagged type opcode, then the process moves to step S728, which is described above. If, however, the RDMA opcode is a tagged type opcode, then the process moves to step S720. At step S720 the RNIC checks to see if the heading includes a valid STag. If the STag is not valid, then the process moves to step S728, which is described above. If, however, the STag is valid, then the process moves to step S734.

At step S734, the RNIC checks whether the FPDU length plus the MPA header size is greater than the TCP payload size. If it is, the FPDU extends into the next TCP segment, and the process moves to step S736. At step S736, the RNIC checks whether the next TCP segment is available. If it is not, the process moves to step S732 (FIG. 7A) and the RNIC buffers the TCP segment until it becomes in order.

If either the FPDU length plus the MPA header size is less than the TCP payload size (step S734), or the next TCP segment is available (step S736), the process moves to step S738. At step S738 the RNIC verifies the MPA CRC of the received FPDU, and if the CRC is good, the FPDU is processed in step S708 (FIG. 7A). It however, the CRC is not good, then the FPDU is discarded and the ULP is notified of the error in step S740.

For FPDU's having untagged headers, the RNIC walks through the payload testing key fields in steps S722, S724 and S726 to determine the probability of the current offset being the FPDU header. In step S722 the RNIC verifies that the RDMA opcode is an untagged type opcode. Examples of untagged type opcodes are shown on the bottom of FIG. 7B. In steps S724 and S726 the RNIC verifies that the queue number and the MSN of the TCP segment are valid. If any of the items checked in steps S722. S724 and S726 are untrue, then the process moves to step S728, which is described above. If, however, all of the items checked in steps S722, S724 and S726 are true, then the process moves to step S734, which is also described above.

SCOPE OF THE INVENTION

The above description presents the best mode contemplated for carrying out the present system and methods for locating FPDU headers when markers are disabled, and of the manner and process of practicing them, in such full, clear, concise, and exact terms as to enable any person skilled in the art to which they pertain to practice this system and these methods. This system and these methods are, however, susceptible to modifications and alternate constructions from those discussed above that are fully equivalent. Consequently, this system and these methods are not limited to the particular embodiments disclosed. On the contrary, this system and these methods cover all modifications and alternate constructions coming within the spirit and scope of the system and methods as generally expressed by the following claims, which particularly point out and distinctly claim the subject matter of the system and methods.

What is claimed is:

1. A method, in a remote direct memory access protocol (RDMAP) application, for locating a marker protocol data unit aligned (MPA) framed protocol data unit (FPDU) in an out of order transmission control protocol (TCP) segment when markers are disabled, the method comprising the steps of:
   performing a first cyclic redundancy check (CRC) on all data within the TCP segment;
   when the first CRC fails, reading what is assumed to be an FPDU length value and performing a second CRC on a portion of the data specified by the FPDU length value; wherein the assumed FPDU length value is equal to a first word in a payload of the TCP segment, plus an MPA header size, plus an applicable pad count;
   when the second CRC fails, walking a plurality of payload testing key fields in a direct data placement (DDP) header of an offset in the TCP segment to determine a probability of the offset being the start of an FPDU;
   upon identifying a potential FPDU, performing a third CRC on the potential FPDU; and
   when the third CRC is successful, determining that the potential FPDU is an actual FPDU and processing the actual FPDU.

2. The method of claim 1, wherein the step of walking a plurality of payload testing key fields comprises verifying that a DDP version number equals one, verifying that a DDP tagged flag equals one, verifying that an RDMAP opcode is a tagged type opcode, and verifying that a steering tag is valid.

3. The method of claim 2, wherein the tagged type opcode comprises one of an RDMA read request and an RDMA write request.

4. The method of claim 1, wherein the step of walking a plurality of payload testing key fields comprises verifying that a DDP version number equals one, verifying that a DDP tagged flag does not equal one, verifying that an RDMAP opcode is an untagged type opcode, verifying that a queue number is valid, and verifying that a message sequence number (MSN) is valid.

5. The method of claim 4, wherein the untagged type opcode comprises one of an RDMA read request, a send request, a send with invalidate request, a send with solicited event request, a send with solicited event and invalidate request, and a terminate request.

6. The method of claim 1, further comprising the step of determining whether the FPDU_length value, plus an MPA header size, is greater than a size of a payload of the TCP segment.

7. The method of claim 6, further comprising the step of determining whether a next TCP segment is available when the FPDU length value, plus the MPA header size, is greater than the TCP segment payload size.

8. A method for locating a marker protocol data unit aligned (MPA) framed protocol data unit (FPDU) in an out of order transmission control protocol (TCP) segment when markers are disabled, the method comprising the steps of:
 a) performing a first cyclic redundancy check (CRC) on all data within the TCP segment;
 b) when the first CRC fails, reading what is assumed to be an FPDU_length value and performing a second CRC on a portion of the data specified by the FPDU_length value; wherein the assumed FPDU_length value is equal to a first word in a payload of the TCP segment, plus an MPA header size, plus an applicable pad count;
 c) when the second CRC fails, walking a plurality of payload testing key fields in a direct data placement (DDP) header of an offset in the TCP segment to determine a probability of the offset being the start of an FPDU;
 d) upon determining that the potential FPDU is not an actual FPDU, moving to a subsequent offset in the TCP segment and decrementing a TCP payload size value by one;
 e) comparing the TCP payload size value to a minimum FPDU size; and
 f) when the TCP payload size value is not less than the minimum FPDU size, repeating step c).

9. The method of claim 8, further comprising the steps of:
 upon identifying a potential FPDU, performing a third CRC on the potential FPDU; and
 when the third CRC is successful, determining that the potential FPDU is an actual FPDU and processing the actual FPDU.

10. The method of claim 9, further comprising the step of determining whether the FPDU_length value, plus an MPA header size, is greater than a size of a payload of the TCP segment.

11. The method of claim 10, further comprising the step of determining whether a next TCP segment is available when the FPDU_length value, plus the MPA header size, is greater than the TCP segment payload size.

12. The method of claim 8, wherein the step of walking a plurality of payload testing key fields comprises verifying that a DDP version number equals one, verifying that a DDP tagged flag equals one, verifying that an RDMAP opcode is a tagged type opcode, and verifying that a steering tag is valid.

13. The method of claim 12, wherein the tagged type opcode comprises one of an RDMA read request and an RDMA write request.

14. The method of claim 8, wherein the step of walking a plurality of payload testing key fields comprises verifying that a DDP version number equals one, verifying that a DDP tagged flag does not equal one, verifying that an RDMAP opcode is an untagged type opcode, verifying that a queue number is valid, and verifying that a message sequence number (MSN) is valid.

15. The method of claim 14, wherein the untagged type opcode comprises one of an RDMA read request, a send request, a send with invalidate request, a send with solicited event request, a send with solicited event and invalidate request, and a terminate request.

16. A method for locating a marker protocol data unit aligned (MPA) framed protocol data unit (FPDU) in an out of order transmission control protocol (TCP) segment when markers are disabled, the method comprising the steps of:
 performing a first cyclic redundancy check (CRC) on all data within the TCP segment;
 when the first CRC fails, reading what is assumed to be an FPDU_length value and performing a second CRC on a portion of the data specified by the FPDU_length value; wherein the assumed FPDU_length value is equal to a first word in the TCP segment payload, plus an MPA header size, plus an applicable pad count;
 when the second CRC is successful, determining that the FPDU is located at a beginning of a payload of the TCP segment; and
 processing the FPDU.

17. A system for locating a marker protocol data unit aligned (MPA) framed protocol data unit (FPDU) in an out of order transmission control protocol (TCP) segment when markers are disabled, the system comprising:
 a host system including a processor, memory and a remote direct memory access (RDMA) enabled network interface controller (RNIC), the RNIC including a processor and a memory;
 wherein the host system is configured to
  perform a first cyclic redundancy check (CRC) on all data within the TCP segment;
  when the first CRC fails, read what is assumed to be an FPDU_length value and perform a second CRC on a portion of the data specified by the FPDU_length value; wherein the assumed FPDU_length value is equal to a first word in a payload of the TCP segment, plus an MPA header size, plus an applicable pad count;
  when the second CRC fails, walk a plurality of payload testing key fields in a direct data placement (DDP) header of an offset in the TCP segment to determine a probability of the offset being the start of an FPDU;
  upon identifying a potential FPDU, perform a third CRC on the potential FPDU; and
  when the third CRC is successful, determine that the potential FPDU is an actual FPDU and process the actual FPDU.

* * * * *

UNITED STATES PATENT AND TRADEMARK OFFICE
CERTIFICATE OF CORRECTION

PATENT NO.         : 7,765,317 B1                                      Page 1 of 1
APPLICATION NO. : 12/165464
DATED              : July 27, 2010
INVENTOR(S)        : Charles Micalizzi, Jr.

It is certified that error appears in the above-identified patent and that said Letters Patent is hereby corrected as shown below:

In column 1, line 49, delete "Slag" and insert -- STag --, therefor.

In column 2, line 19, delete "Further." and insert -- Further, --, therefor.

In column 5, line 41, delete "(Slag)" and insert -- (Stag) --, therefor.

In column 8, line 33, in claim 1, delete "FPDU length" and insert -- FPDU_length --, therefor.

In column 8, line 34, in claim 1, delete "FPDU length" and insert -- FPDU_length --, therefor.

In column 8, line 35, in claim 1, delete "FPDU length" and insert -- FPDU_length --, therefor.

In column 9, line 7, in claim 7, delete "FPDU length" and insert -- FPDU_length --, therefor.

Signed and Sealed this

Twenty-sixth Day of October, 2010

David J. Kappos
*Director of the United States Patent and Trademark Office*